United States Patent
Ou et al.

(10) Patent No.: US 12,235,817 B2
(45) Date of Patent: Feb. 25, 2025

(54) HASH ENGINE FOR CONDUCTING POINT QUERIES

(71) Applicants: Lemon Inc., Grand Cayman (KY); Beijing Volcano Engine Technology Co., Ltd., Beijing (CN)

(72) Inventors: Jiaxin Ou, Beijing (CN); Jingwei Zhang, Beijing (CN); Hao Wang, Los Angeles, CA (US); Hui Zhang, Los Angeles, CA (US); Ming Zhao, Beijing (CN); Yi Wang, Beijing (CN); Zhengyu Yang, Los Angeles, CA (US)

(73) Assignees: Beijing Volcano Engine Technology Co., Ltd., Beijing (CN); Lemon Inc., Grand Cayman (KY)

( * ) Notice: Subject to any disclaimer, the term of this patent is extended or adjusted under 35 U.S.C. 154(b) by 0 days.

(21) Appl. No.: 18/475,695

(22) Filed: Sep. 27, 2023

(65) Prior Publication Data
US 2024/0070135 A1    Feb. 29, 2024

(51) Int. Cl.
*G06F 16/22* (2019.01)
*G06F 16/2455* (2019.01)

(52) U.S. Cl.
CPC ...... *G06F 16/2228* (2019.01); *G06F 16/2219* (2019.01); *G06F 16/24552* (2019.01)

(58) Field of Classification Search
CPC ........... G06F 16/2228; G06F 16/24552; G06F 16/2219
USPC ......................................................... 707/741
See application file for complete search history.

(56) References Cited

U.S. PATENT DOCUMENTS

| | | | |
|---|---|---|---|
| 9,400,816 B1* | 7/2016 | Gubarev | G06F 16/2246 |
| 10,540,355 B1* | 1/2020 | Agnich | G06F 16/25 |
| 11,263,173 B2* | 3/2022 | Bedadala | G06F 16/27 |
| 2005/0065910 A1* | 3/2005 | Welton | G06F 16/2264 |
| 2009/0315905 A1* | 12/2009 | Lu | H04N 19/13 |
| | | | 345/555 |
| 2019/0172173 A1* | 6/2019 | Ceylan | G06T 15/005 |
| 2019/0205244 A1* | 7/2019 | Smith | G06F 3/065 |
| 2021/0389883 A1* | 12/2021 | Derryberry | G06F 11/2094 |
| 2022/0391394 A1* | 12/2022 | Schreter | G06F 16/248 |
| 2023/0251963 A1* | 8/2023 | Alwadi | G06F 8/65 |
| | | | 711/105 |

OTHER PUBLICATIONS

Huo, Hongwei, et al., "Practical Succinct Indexes in External Memory", Data Compression Conference 2018, Snowbird, UT, Mar. 27-30, 2018, pp. 217-226.*

(Continued)

*Primary Examiner* — Robert Stevens
(74) *Attorney, Agent, or Firm* — Fish & Richardson P.C.

(57) ABSTRACT

Systems and methods are provided for improved point querying of a database. The index values are separated from data and retained in cache memory to allow access without requiring a disk input/output (I/O) operation and thereby having less latency resulting from such disk I/O operations. The index values can be compressed using an algorithm such as Crit-Bit-Trie to allow storage of the index values in limited cache memory space. The index values can be selected for storage according to a least recently used approach when cache memory is insufficient to store all index values to maintain a hit rate for the cached portion and reduce the disk I/O operations.

20 Claims, 13 Drawing Sheets

(56) References Cited

OTHER PUBLICATIONS

Wang, Hao, et al., "LavaStore: ByteDance's Purpose-built, High-performance, Cost-effective Local Storage Engine for Cloud Services", VLDB '24, Guangzhou, China, Aug. 26-30, 2024, pp. 3799-3812.*

Ferragina, Paolo, et al., "Compressing and indexing labeled trees, with Applications", Journal of the ACM, vol. 57, Issue 1, Article No. 4, Nov. 27, 2009, pp. 1-33.*

* cited by examiner

HASH ENGINE FOR CONDUCTING POINT QUERIES

FIELD

This disclosure is directed systems and methods for conducting point queries of a database.

BACKGROUND

Point queries in database systems and cloud-based storage can cause high tail latency, particularly due to read input/output (I/O) operations and the need to access disks to conduct the query. This can be particularly pronounced for systems using solid-state drives (SSDs).

SUMMARY

This disclosure is directed systems and methods for conducting point queries of a database.

By using memory-efficient indexing structures and caching techniques, an index having a high hit rate can be maintained in a cache, reducing the number of disk I/O operations required to complete a point query. This in turn improves the efficiency of the database system in responding to such point queries, thereby improving the operation of the database system itself. In particular, index components can be separated from data components, with only the index components being maintained in the cache to allow the storage of said index components in the limited cache memory available. Further, the index components can be compressed to further allow the index to be stored in limited cache memory. The compression can use a Crit-Bit-Trie compression approach to provide the compression, allowing storage of the index in the limited cache memory. Where data cannot be entirely stored in cache, a least recently used (LRU) strategy can be employed to select the data that is maintained in cache, supporting the hit rate of the cached index data when not all index data can be cached. Accordingly, disk I/O requests required to service the point query can be reduced, even to a single I/O request in some instances, thereby avoiding much of the tail latency and causing the database system to operate more efficiently and quickly.

In an embodiment, a database system includes one or more memories storing a database, a cache memory, and one or more processors. The one or more processors together are configured to obtain index information from the database. The index information is separate from a data component of the database. The one or more processors are further configured to generate a compact index based on the index information. The compact index is smaller in size than the index information. The compact index is generated by at least one of compression of the index information and omission of a portion of the index information from the compact index. The one or more processors are further configured to direct the storage of the compact index in the cache memory, receive a point query, and identify data responsive to the point query by referencing the compact index stored in the cache memory. The one or more processors are also configured to retrieve the data responsive to the point query from the database.

In an embodiment, the index information includes a first-level index mapping keys to blob file numbers and a second-level index mapping keys to block offsets within said blob file.

In an embodiment, the one or more processors are configured to perform the compression of the index information using a compression algorithm selected from the group consisting of Zstandard, LZ4, Snappy, Bzip2, LZMA, Gzip, Blosc, and Crit-Bit-Trie compression algorithms. In an embodiment, the compression algorithm is Crit-Bit-Trie.

In an embodiment, the one or more processors are configured to select the portion omitted from the index information based on a least recently used strategy.

In an embodiment, the portion of the index information omitted from the compact index is stored in the one or more memories, and the one or more processors are configured to obtain the omitted index information from the one or more memories when the index information stored in the cache memory is not responsive to the point query.

In an embodiment, the compact index stored in the cache memory includes all index metadata for the index information.

In an embodiment, the one or more processors are configured to perform cache warmup when the database is started up, the cache warmup including obtaining initial index data and storing the initial index data in the cache memory.

In an embodiment, each key-value entry of the index information stored in the cache memory has a size of 6 B or less.

In an embodiment, the one or more processors are configured to identify the data responsive to the point query and to retrieve the data responsive to the point query from the one or more memories storing the database using one single input/output operation.

In an embodiment, a method for point querying of a database includes obtaining index information from the database, the index information being separate from a data component of the database, and generating, based on the index information, a compact index using a processor. Generating the compact index includes at least one of compressing the index information and omitting a portion of the index information from the compact index. The method further includes storing the index information in a cache memory, receiving a point query, and identifying data responsive to the point query by referencing the index information stored in the cache memory. The method further includes retrieving the responsive data from the database.

In an embodiment, the index information includes a first-level index mapping keys to blob file numbers and a second-level index mapping keys to block offsets within said blob file.

In an embodiment, generating the compact index includes compressing the index information using a compression algorithm selected from the group consisting of Zstandard, LZ4, Snappy, Bzip2, LZMA, Gzip, Blosc, and Crit-Bit-Trie compression algorithms. In an embodiment, the compression algorithm is Crit-Bit-Trie.

In an embodiment, generating the compact index includes omitting the portion of the index information from the compact index, wherein said portion of the index information is determined based on a least recently used strategy.

In an embodiment, when the index information stored in the cache memory is not responsive to the point query, the method further includes accessing the database to obtain the omitted portion of the index information.

In an embodiment, the method further includes performing cache warmup when the database is started up, wherein cache warmup includes obtaining initial index data and storing the initial index data in the cache memory.

In an embodiment, the identifying of data responsive to the point query and the retrieving of the responsive data from the database is performed using one single input/output operation.

In an embodiment, each key-value entry of the index information stored in the cache memory has a size of 6 B or less.

In an embodiment, the compact index stored in the cache memory includes all index metadata for the index information.

In an embodiment, a hash engine system for a database includes one or more processors configured to receive index information. The index information is separate from a data component of the database. The one or more processors are further configured to generate a compact index based on the index information. Generating the compact index includes at least one of compression of the index information and omission of a portion of the index information from the compact index. The one or more compressors are further configured to direct storage of the compact index in a cache memory.

In an embodiment, the one or more processors are further configured to receive a point query, reference the compact index to determine data responsive to the point query, and based on the compact index, obtain the data responsive to the point query from a database.

DRAWINGS

DETAILED DESCRIPTION

This disclosure is directed systems and methods for conducting point queries of a database.

Figure 1:
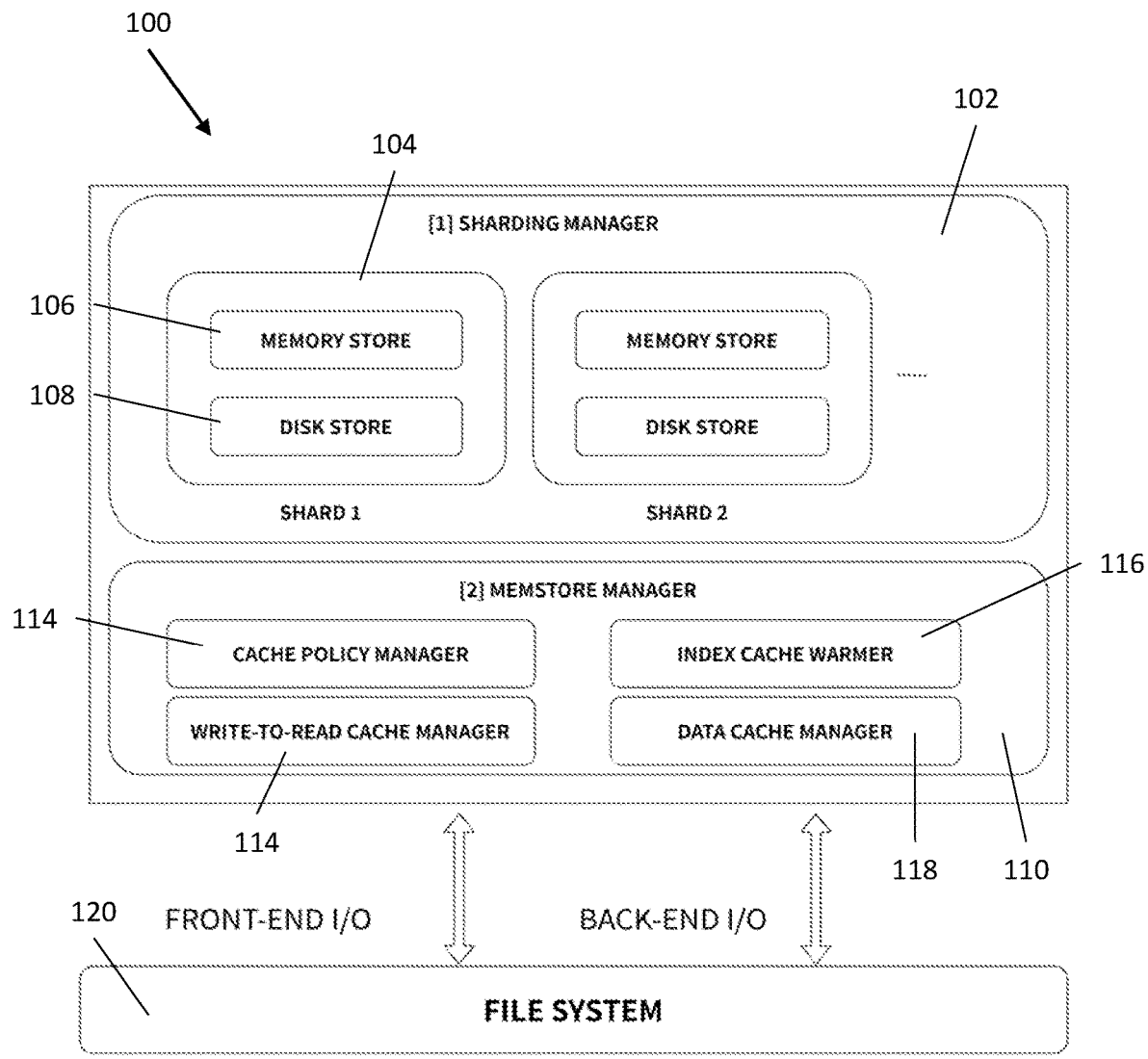
FIG. 1 shows a schematic of a database according to an embodiment.

FIG. 1 shows a schematic of a database according to an embodiment. Database system 100 includes sharding manager 102 and shards 104. Each shard includes a memory store 106 and a disk store 108. The database system 100 further includes a memstore manager 110. The memstore manager 110 can include cache policy manager 112, write-to-read cache manager 114, index cache warmer 116, and data cache manager 118. The database system 100 can be configured to interface with file system 120. Database system 100 can be configured to provide a high cache hit rate for point queries, reducing reference to disk store 108 when handling point queries through compact storage of index data in memory store 106.

Database system 100 is configured to enable efficient point queries through the management of indexes for the stored data. Database system 100 can require any suitable processors, memories, and/or other computing devices to carry out the functions described herein.

Sharding manager 102 manages the sharding of the data of the database system. Sharding can include partitioning and distributing data across multiple nodes or servers of database system 100. Sharding by the sharding manager 102 can allow each shard to manage its own index, reducing computational overhead, reduce unnecessary copying during garbage collection on the database, and control the allocation of resources to each shard. Sharding manager 102 can divide the data of the database into shards 104, for example by splitting the database or particular shards thereof or merging shards according to any suitable criteria.

Shards 104 each include a memory store 106. Memory store 106 is a cache memory. Memory store 106 can include one or more memory devices suitable for cache operations, such as, as non-limiting examples, dynamic random access memory (DRAM), persistent memory (PMEM), solid state drives (SSDs) such as NVMe SSDs. Memory store 106 can contain indexes for the data in the respective disk store 108 of the shard 104, such as a compact index for point lookup as described herein.

Shards 104 also each include a disk store 108 configured to store the data distributed to that particular shard 104 by the sharding manager 102. Disk store 108 includes one or more suitable storage memories, such as, as non-limiting examples, PMEM, SSDs such as NVMe SSDs, or hard disk drives (HDDs). In embodiments, disk store 108 can store index information that cannot be retained in memory store 106, for example due to the indexes having a size greater than a capacity of the memory store 106.

Memstore manager 110 is a module for memory management. Memstore manager 110 can include any suitable hardware, software, and combinations thereof for performing the management of memory as described herein. Memstore manager 110 includes cache policy manager 112. Cache policy manager 112 is configured to generate a compact index cache to store index information such that the index information can be maintained in memory store 106. The cache policy manager is configured to generate a compact index cache to store key index information. The caching strategy for the compact index cache prioritizes caching all index metadata, index data from first-level indexes, and all index data from first and second level indexes.

The compact index cache can include multiple layers. One layer can be stored as an SST file abstract following the key-value separation on the database. The SST file abstract can store data in the form of keys pointing to blob file numbers. A second layer can contain keys pointing to data block offsets. The second layer can be stored in a blob file abstract. Each layer can include index metadata which is also included in the cache. In an embodiment, a total size of this index metadata in memory is <=1.4B per entry. Based on an estimation for database with approximately 4 million entries, the index metadata occupies a total of 5.6 GB memory, and thus can be completely cached in memory. In addition to the index metadata, the first level of the index can be provided in the cache, such as first level compact index 202 as described in further detail below and shown in FIG. 2.

Memstore manager 110 can further include a write-to-read cache manager 114. Write-to-read cache manager 114 is configured to ensure the cache remains valid following background tasks such as compaction, flush, and garbage collection (GC) operations of database system 100. Maintaining cache validity using the write-to-read cache manager 114 can reduce read latency fluctuations after compaction that could result from cache misses. When these background tasks recombine old data from the old blocks and write them into new blocks, write-to-read cache manager 114 is configured to proactively write the new blocks to the cache, to maintain the validity of the cached index data relative to the new blocks of data. Write-to-read cache manager 114 can be configured to perform this writing of new blocks to the cache selectively so as to avoid pollution of the cache with excessive data.

Memstore manager 110 can include an index cache warmer 116. Cache warmer 116 can address the index cache being empty at database startup. The empty cache can cause latency fluctuations early in database operations. Cache warmer 116 can be operated at startup of the database to generate the cache. Cache warmer 116 can run a background thread that traverses all file abstracts containing first-level index data and stored data abstracts containing the second-level index data within the database of database system 100 or a particular shard 104 thereof. The data can be used to generate compact index files according to the operation of cache policy manager 112 as discussed above. The compact index files generated by cache warmer 116 can be used as the index cache. This can reduce potential cache misses, and improve overall query performance during the period following startup of the database.

Memstore manager 110 can include data cache manager 118. Data cache manager 118 can regulate the caching of data, for example, determining if data is to be cached as blocks or entire rows. Caching entire rows can potentially improve cache hit rates significantly and provide more efficient use of memory and faster access times. When a point query is made, the entire row associated with the queried key can be fetched directly from the cache when the data is present in the cache and stored as such a row, eliminating the need for block-level lookups and increasing cache hit rates. However, row storage takes more space in memory, and requires further overhead. Accordingly, data cache manager 118 can determine the form the data is to be cached as, such as blocks or rows as discussed here. Non-limiting examples of factors assessed by data cache manager 118 can include the size of rows, cache eviction policies, memory utilization, and the overall impact on query performance. Data cache manager 118 can determine, based on such factors, whether to store cached information as blocks or rows, and to direct such storage in the cache.

File system 120 is a file system configured to communicate with database system 100 by way of front- and/or back-end input/output (I/O) systems. File system 120 can include connections to drives such as SSDs provided in a kernel space of a computing system including the database system 100.

Figure 2:
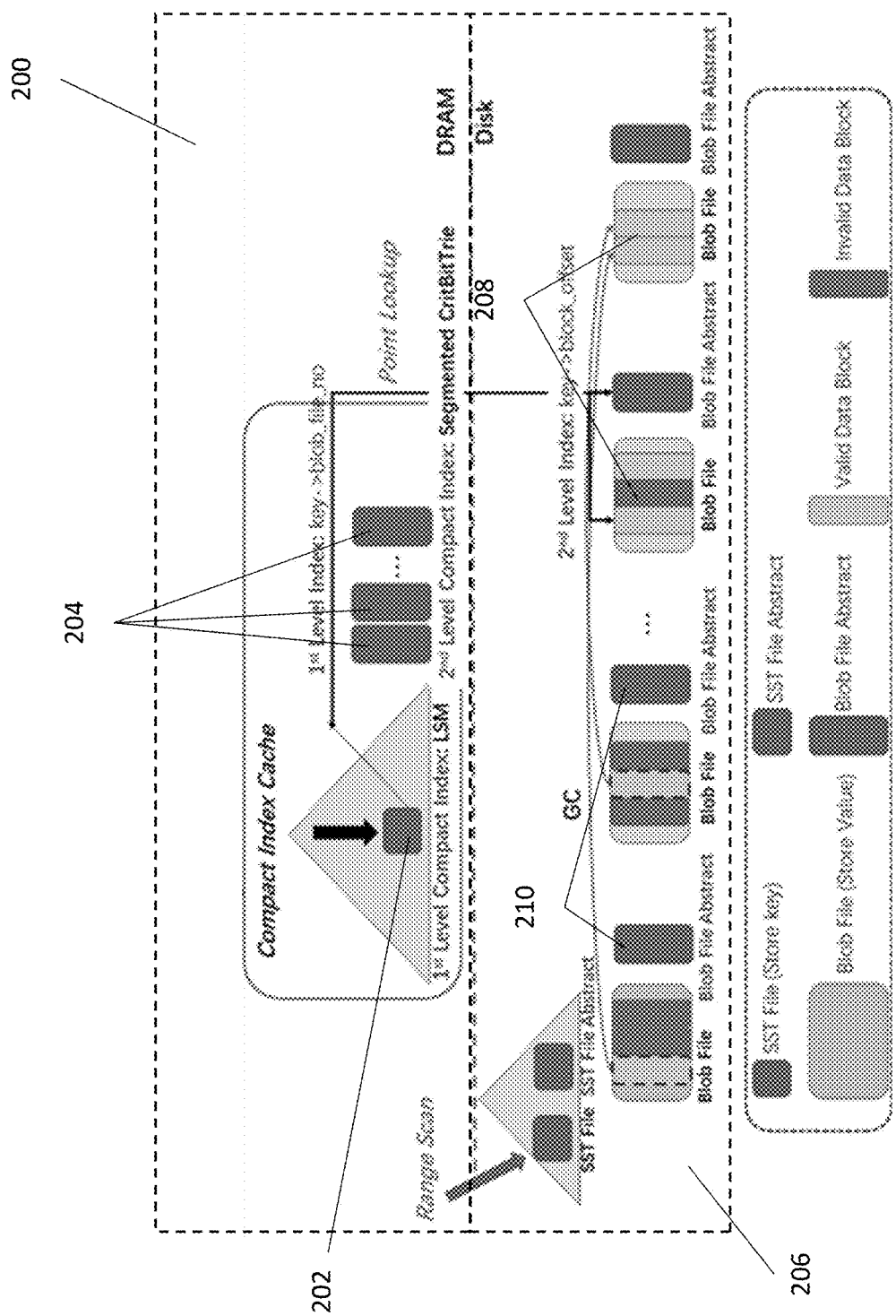
FIG. 2 shows an index structure according to an embodiment.

FIG. 2 shows an index structure according to an embodiment. Cache memory 200 contains a first level compact index 202 and one or more second level compact indexes 204. A storage memory 206 contains blob files 208 each having a blob file abstract 210.

Cache memory 200 is a cache memory, separate from storage memory 206. Cache memory 200 can include one or more suitable memory devices for cache operations, such as DRAM, PMEM, one or more SSDs such as NVMe SSDs, or the like. The cache memory is configured to store a compact index. In an embodiment, the compact index can be accessed without requiring the accessing of storage memory 206. The compact index can contain key values obtained from separation of said key values from data components in the blob files 208. In an embodiment, the key-value separation mechanism utilizes a LSM tree structure, providing benefits such as block-level disk indexing and compressed data blocks for reduced index overhead. In an embodiment, the compact index can identify data responsive to a point query without requiring access to the storage memory 206. The compact index stored in cache memory 200 can include a first level compact index 202 and second level compact index 204.

First level compact index 202 maps keys to blob file numbers (blob_file_no) of the blob files 208. The first level compact index can be stored in any suitable file, for example residing in an SST file. Each SST file can have an associated SST file abstract, which can contain the first-level compact index 202. The first level compact index 202 can be organized according to an LSM tree structure, receiving the results of the key-value separation in LSM tree form and being stored accordingly.

Second level compact indexes 204 map keys to block offsets (block_offset) within the blob file 208. Each blob file 208 can have a corresponding blob file abstract 210 containing the offsets referred to by the respective second-level compact index 204. For the second-level compact indexes 204, a blob file abstract 210 can be generated for each corresponding blob file 208 to store the offsets corresponding to each second level compact index 204.

Storage memory 206 is a memory configured to store the data of the database, such as the blob files 208. Storage memory 206 can be any suitable storage memory such as PMEM, SSDs, HDDs, or the like. Blob files 208 are binary large objects, such as chunks of binary data, for example binary data encoding large objects such as, as non-limiting examples, video, audio, images, combinations thereof, and the like. The blob files can include a blob file abstract 210 contains data referred to by the second level compact indices, such that the blob file abstract 210 can identify a valid data block in accordance with the offsets provided in second level compact index 204.

Figure 3:
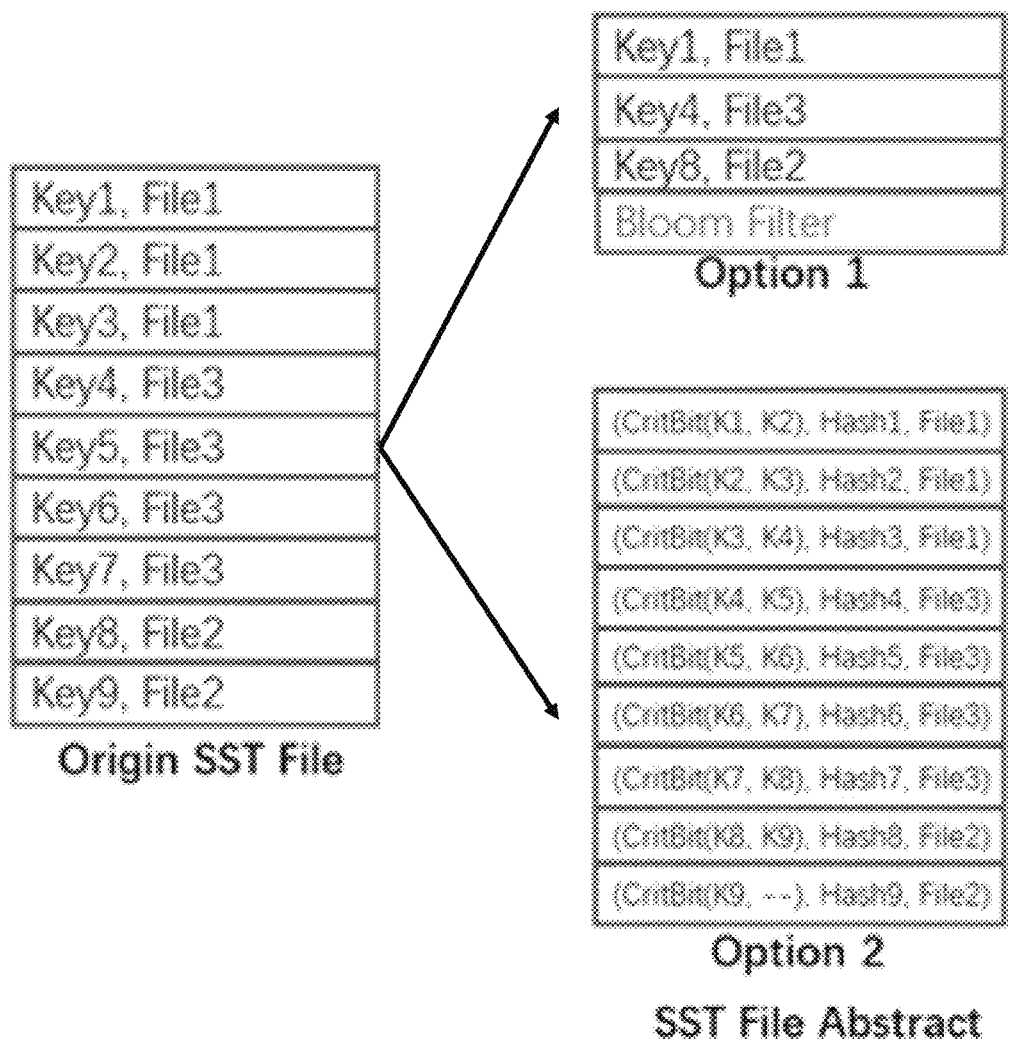
FIG. 3 shows examples of key storage according to an embodiment.

FIG. 3 shows examples of key storage according to an embodiment. After key-value separation, an SST file can result, the SST file containing the first-level index data associating each key with a particular blob file number. The size of this SST file can be reduced to generate a compact index. The compact index can be generated by any suitable means for reducing the size of the first-level index data while maintaining index properties thereof. Examples of methods for generating the compact index include reducing the number of indexed keys, or decreasing a size of the keys through compression. The method for generation of the compact index can be adaptively selected so as to reduce memory overhead. The adaptive selection can be selection of a key reduction or a compression approach based on a determined estimate for memory overhead for each respective approach. The memory overhead can be determined for each approach based on the characteristics of the SST file, such as the size of the SST file, the contents of the SST file, and the like. The memory overhead and adaptive selection of the compact index approach having reduced memory overhead can be performed for each SST file. The resulting compact indexes can be stored in cache memory for subsequent performance of point searches relating to values in the data for which the keys were indexed.

The reduction of the number of indexed keys can be according to any suitable removal of keys from the compact index. In an embodiment, the boundaries of adjacent keys pointing to the same Blob file are saved in the compact index. As shown in FIG. 3, in this approach, Key1, Key4, and Key8 are saved as those represent the boundaries between files. When the engine needs to find the specific blob file number where the desired value is stored based on the key in the first-level index, a binary search among these three keys is performed to locate the corresponding file number. Since not all keys are stored in this approach to generating a compact index, there may be instances of false positives. When a false positive occurs, real key content must be obtained from the blob file, requiring an I/O operation for the storage media containing the blob file. Accordingly, false positives can reduce the advantage of cached compact indexes in reducing storage I/O operations during the point search. To address false positives from the reduced key set, a bloom filter for all keys can be generated and utilized to identify where there is no responsive data to reduce the false positive rate. The bloom filter can be stored in the compact index generated according to this approach. The size of a compact index formed in this manner, and the resulting space savings compared to the original SST file can be variable, dependent on the number of keys that are found at boundaries between files. The reduction of indexed keys according to file boundaries depends on the arrangement of key-value pairs within the blob file. Accordingly, where key-value pairs are interleaved, boundaries will be detected frequently and an extent of reduction in the number of indexed keys can be diminished due to this interleaving, thus resulting in relatively high memory overhead for compact indexes obtained by removal of keys. In an embodiment, background compaction can be performed to rewrite all values, causing consecutive key-value combinations to be written back to the same blob file.

Compression of the keys can be performed by any suitable compression algorithm. Non-limiting examples of suitable compression algorithms or libraries include Zstandard, LZ4, Snappy, Bzip2, LZMA, Gzip, Blosc, Crit-Bit-Trie, and the like. The compression ratio and/or speed of operations for the compression algorithm can be used as selection criteria for the compression algorithm to be used. In the embodiment shown in FIG. 3, Crit-Bit-Trie is used to compress the key. In an embodiment, the compressed key can include additional storage of the key's hash value to reduce the false positive rate and reduce the performance of extra storage I/O operations. The hash value can be stored in any suitable form. In an embodiment, a 1-bit hash width can be used. In the embodiment shown in FIG. 3, the Compact Index where keys are all included, and compressed with Crit-Bit-Trie, each key will consistently consume 3B and the resulting compact index will be sized accordingly.

Figure 4:
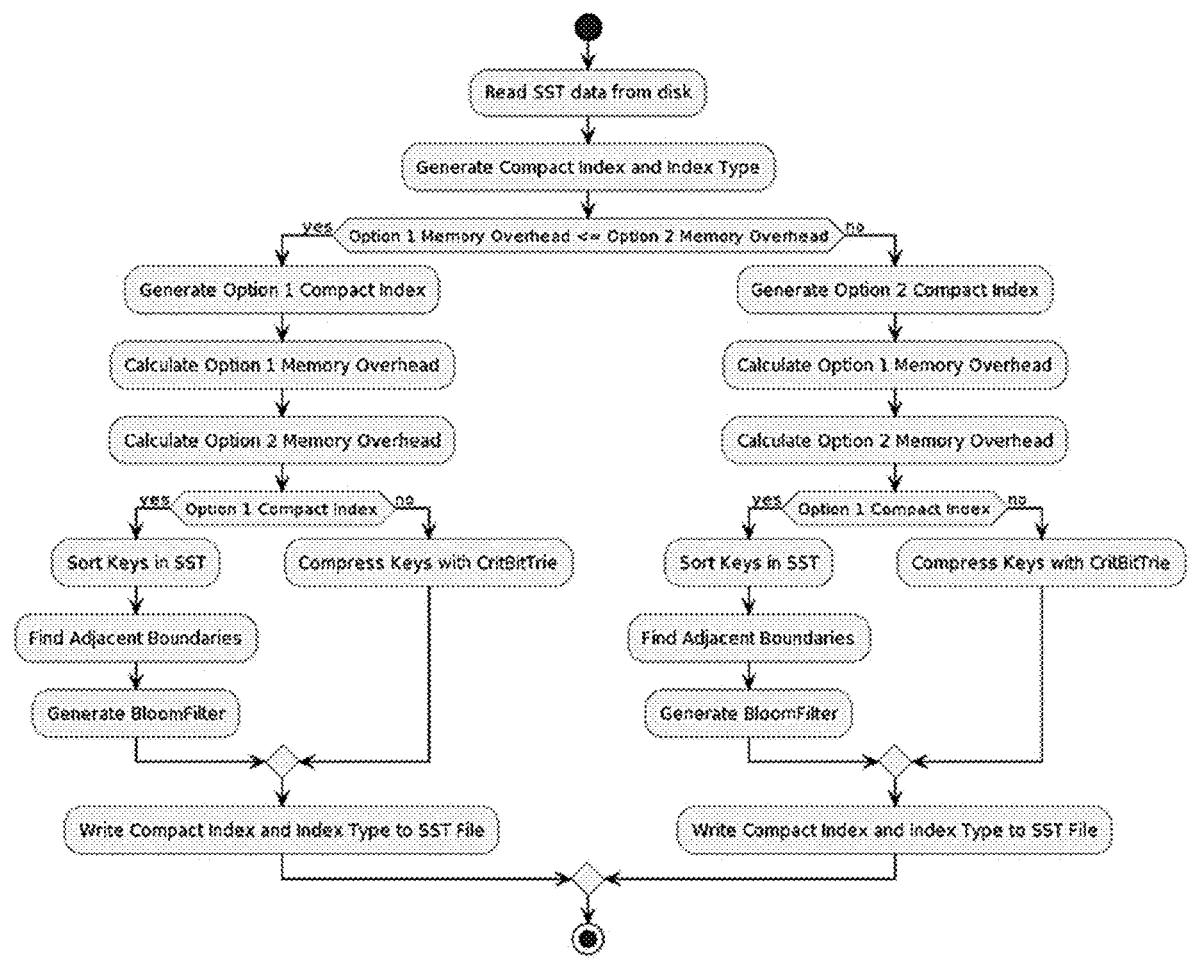
FIG. 4 shows a logic flow for preparing a compact index according to an embodiment.

FIG. 4 shows a logic flow for preparing a compact index according to an embodiment. SST data is obtained from the disk and a compact index is generated. As shown in FIG. 4, memory overhead is determined for the respective options of either reducing the number of indexed key-value combinations or reducing key size through compression. The option having the lower memory overhead is performed, then the memory overhead for the respective options are again calculated. When the reduction of indexed key values is selected based on the second calculation of memory overhead, the key values at the boundaries of particular blob files are identified and the bloom filter generated as discussed above with respect to FIG. 3. When the compression of key values is selected based on the second calculation of memory overhead, the compression is performed. The resulting compact index and the approach taken for that compact index can then be written to the SST file.

Figure 5:
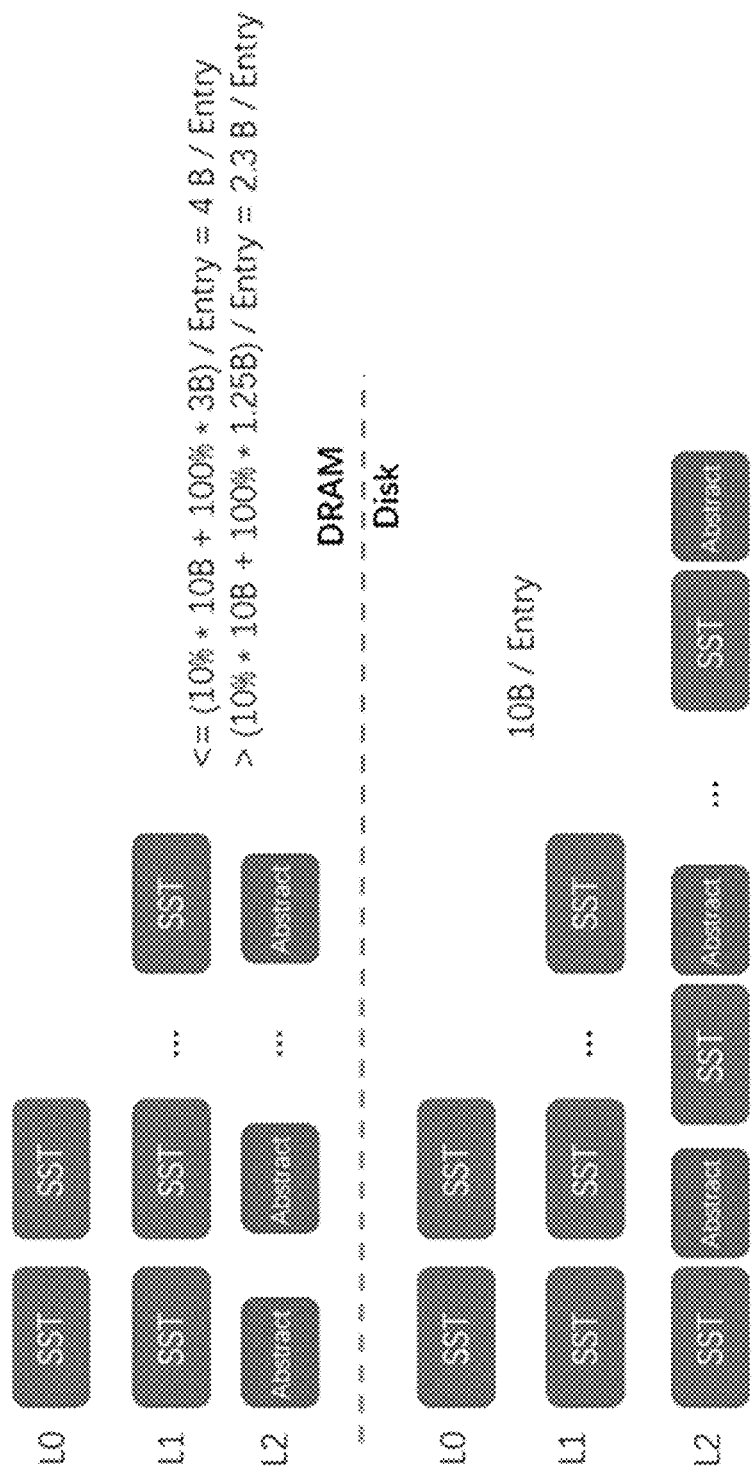
FIG. 5 shows an example of carrying out a read request according to an embodiment.

FIG. 5 shows an example of carrying out a read request according to an embodiment. In the embodiment shown in FIG. 5, the original KV data from the SST for the Compact Index corresponding to L(0) and L(1) is used directly, with the compact indexes only provided at L(2). As a result, for the Index Cache in DRAM as provided in FIG. 5, the original SST is cached for higher levels of the tree, which do not contribute greatly to the overall size of the tree with regards to required storage space. In FIG. 5, the total space occupied by L(0) and L(1) is only about 10% of the entire LSM tree. Accordingly, storing the entire SST for the higher layers of the tree does not significantly increase the memory overhead compared to caching the SST File Abstract for all layers. The storage of the entire tree at high levels can reduce the number of storage I/O operations required in case of a cache miss, and allow the cache misses to be addressed more efficiently, ensuring stable read latency. In an embodiment, the storage of the entire tree at high levels can ensure that a maximum of one storage I/O operation is required when a cache miss occurs.

Figure 6:
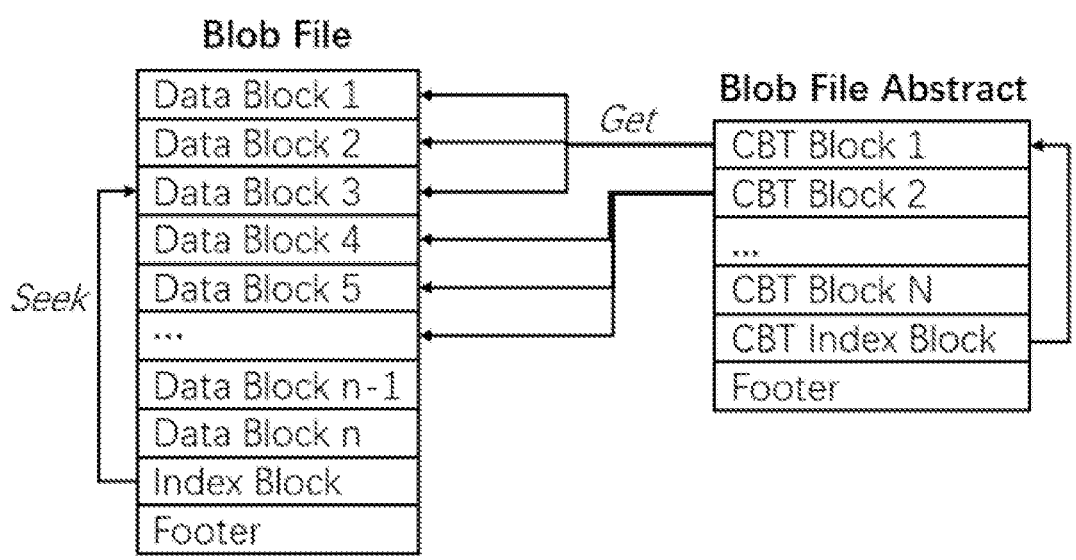
FIG. 6 shows a structure of a blob file according to an embodiment.

FIG. 6 shows a structure of a blob file in the database system 100 according to an embodiment. The blob file of FIG. 6 is a repository for authentic key-value data, with a blob file abstract provided. The blob file abstract can be a blob file abstract according to the second level compact index, such as second level compact index 204 described above. The blob file abstract contains compact index data implemented for point queries. The index block of the blob file can also be maintained in the blob file, instead of being replaced by the compact index so that the index block of the blob file can be used to facilitate seek operations while the blob file abstract is used for get operations such as point queries.

In the blob file abstract, a segmented Crit-Bit-Trie structure can be used to arrange the indexes. Segmenting of the blob file abstract can improve memory access locality, for example by reducing the space in which random access to bit positions may be required. Further, segmenting of the blob file abstract can control the size of the Crit-Bit-Trie index, thus supporting caching of the index. Further, limiting the size of the index also can reduce read latency fluctuations caused by substantial read I/O amplification when the index must be read from the disk, for example due to a cache miss. Segmenting of the Crit-Bit-Trie index can include indexing the specific location of a Crit-Bit-Trie block based on the Key, or within the Crit-Bit-Trie block, indexing the position of the data block within the blob file based on the corresponding Key. Each data block can be a compressed unit of the blob file, for example a compressed unit of the blob file such as a 16 KB portion of the blob file.

Figure 7:
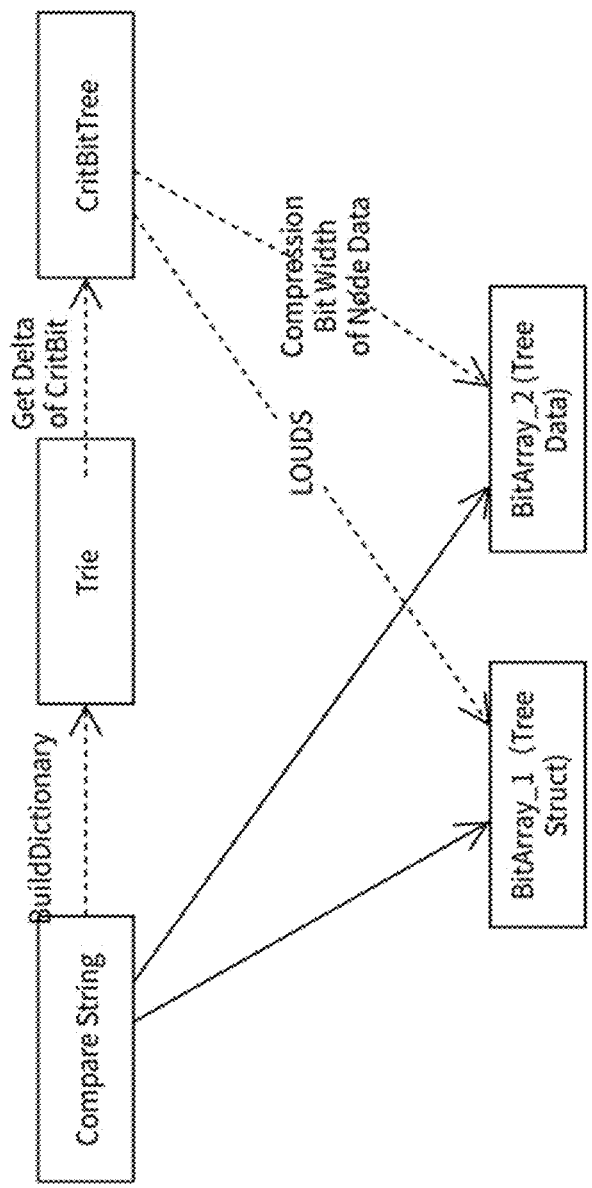
FIG. 7 shows building of an index structure according to an embodiment.

FIG. 7 shows building of an index structure according to an embodiment. The index structure build according to FIG. 7 is a Crit-Bit-Trie index. The Crit-Bit-Trie index can be a transformation of Trie-based string retrieval into a binary tree, by extracting CritBits. The CritBit is a position in the binary representation of two keys where a divergence occurs. Querying keys in a byte-wise manner can be performed by comparing the positions of CritBits in the set of keys, allowing the unique leaf for the desired key to be found. Since the width of the keys following this transformation are not influenced by the overall original key length, and only the positions of the CritBits are recorded, the bit width can be reduced, thus compressing the keys.

As shown in FIG. 7, the string is used to generate the Trie structure, then the Trie is used to obtain the divergences (changes/deltas) to identify the CritBits. The structure of the tree can be stored as BitArray_1 as shown in FIG. 7. To obtain BitArray_1, the binary tree structure can be converted using level-ordered unary degree sequence (LOUDS). The tree structure conversion according to LOUDS can use 1 as a representation for internal nodes and 0 for representing leaf nodes when converting said tree structure. Subsequent operations on the binary tree can then be replaced with Rank/Select operations on the BitArray. BitArray_2 as shown in FIG. 7 can contain the CritBits, which are arranged in ascending order and stored. Where the index includes block offsets, such as in the second level compact index 204 described above and shown in FIG. 2, the block offsets can be recorded in a vector corresponding each block offset to the proper record of the compressed data. In an embodiment, the CritBits can be stored in a binary tree; this tree can be provided to preserve the structure of the original binary tree. In an embodiment, such a binary tree storing the CritBits can be an array of unsigned integers representing the minimum bit widths.

Figure 8:
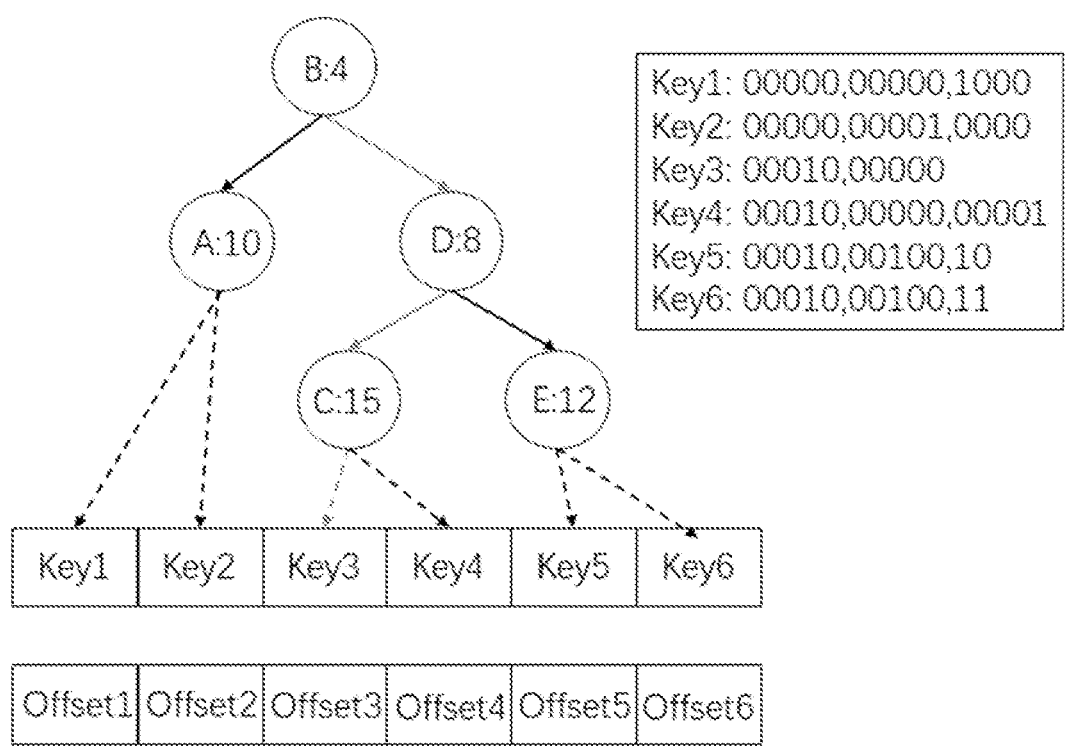
FIG. 8 shows a flow for an index read according to an embodiment.

FIG. 8 shows an example of a flow for an index read according to an embodiment. In the example shown in FIG. 8, there are 6 keys (represented as 1 to 6) and 5 CritBits (represented as ABCDE). During index construction, the lower CritBits are provided at upper levels of the tree to maintain the same order as in lexicographical comparison (from low byte to high byte).

Initially, the index function starts from the root of the binary tree and traverses down. When the bit pointed to by the node is 0, the index function moves to the left subtree; otherwise, the index function moves to the right subtree until it reaches a leaf node. The index function returns the position number of the key (e.g., position number 1 for key2, and 4 for key5 as shown in FIG. 8). Then, based on the position number, the corresponding complete key (best_match_key) is found. The index function then checks whether the identified best_match_key is equal to the target_key of the index read operation. If they are a complete match, the function directly returns the best_match_key.

If the best_match_key does not equal the target_key of the index read operation, it means the path taken is incorrect, and a new search is performed. In the new search, a common prefix is found for the best_match_key and the target_key. This identifies the portion of the binary tree path that was valid. The search following the common prefix then is re-planned. If the value of the target_key is greater than the value of the determined best_match_key, the function moves to the right subtree starting from the node after the common prefix node and continues until it reaches a leaf node, and adds 1 to the position of the leaf node. If the value of the target_key is less than the value of the determined best_match_key, the function moves to the left subtree starting from the node after the common prefix node and continues until it reaches a leaf node, with that leaf node being the final result.

As further examples for the index read in a tree according to the tree shown in FIG. 8, when the target key is 00001, after the index process, best_match_key is key 1, and since target_key is greater than best_match_key, the function needs to go right starting from node A and reaches position 1. After adding 1 to the position, it returns position 2 and key3. When the target key is 00011, after the index process, best_match_key is key3, and since target_key greater best_match_key, the function needs to go right starting from node D and reaches position 5. After adding 1 to the position, it returns position 6 and End. When the target key is 00010,001, after the index process, best_match_key is key5, and since target_key less than best_match_key, the function needs to go left starting from node E and reaches position 4, returning position 4 and key5. When the target key is 00010,00100,01, after the index process, best_match_key is key6, and since target_key is less than best_match_key, the function needs to go left starting from node E and reaches position 4, returning position 4 and key5.

Figure 9:
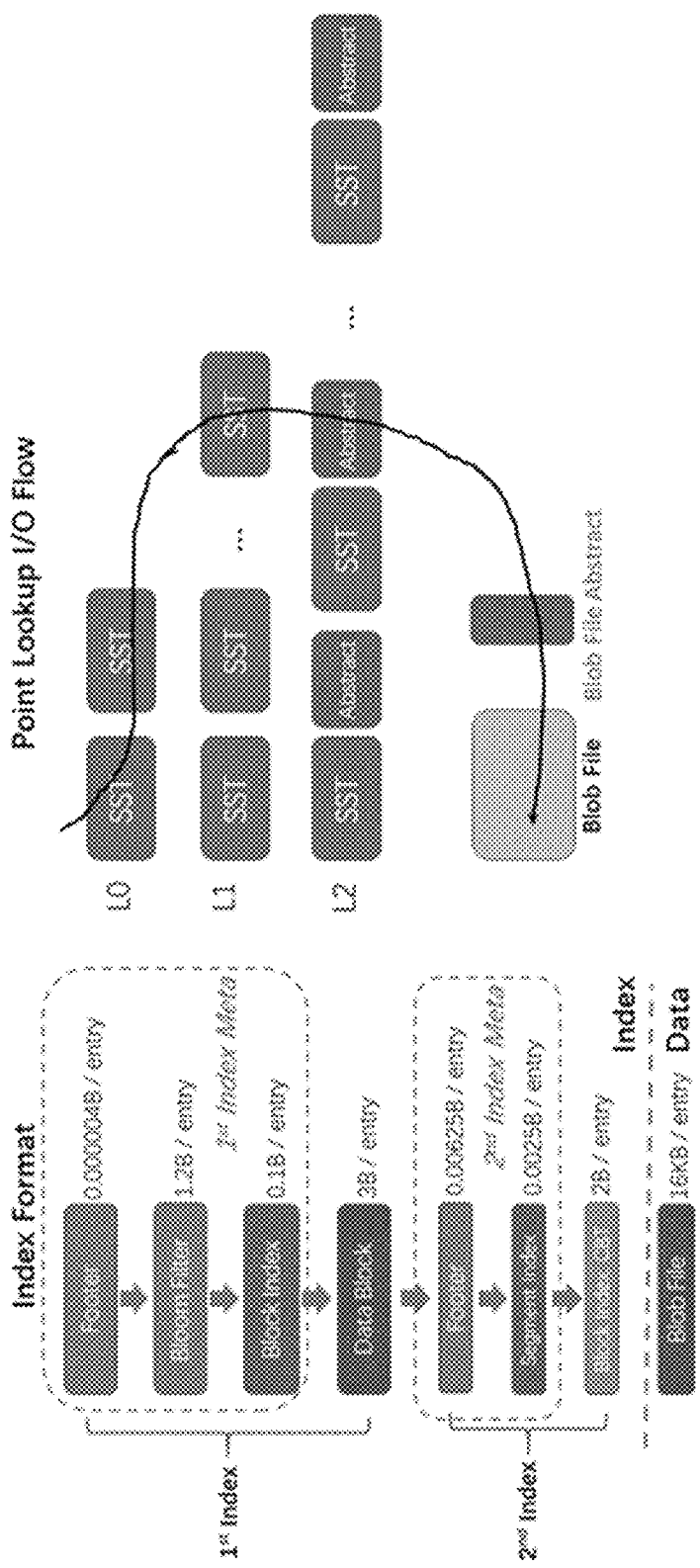
FIG. 9 shows an index cache according to an embodiment.

FIG. 9 shows an index cache according to an embodiment. The compact index cache shown in FIG. 9 can include two layers. The first layer can be stored in an SST File Abstract after the key-value separation. The format of the index data of the first layer can be the key pointing to a specific blob file number. The second layer can be stored in the blob file abstract after the key-value separation, in the format of the key pointing to a data block offset. Both layers of the index contain index metadata. This metadata can also be retained in the cache. A size of the index metadata can be approximately 1.4B or less per entry. Accordingly, for a database having approximately 4 billion entries, the index metadata would occupy a total of approximately 5.6 GB memory or less, thus allowing the caching of such index metadata.

The index metadata can be organized in an LSM Tree. When the index metadata is in the LSM tree format, search of the index can be performed as a top-down sequential process. The search can include first looking into each SST File of the level L(0), then sequentially searches the corresponding SST Files of levels L(1)~L(N−1), and finally performs a search in the corresponding SST File Abstract of L(N), which then leads to the correct blob file abstract for the search and to the correct location within the blob file, as shown by the path taken over the respective filed shown in FIG. 9. When the index metadata for each file is fully cached, at most one I/O operation is required for each file's index data. The index data itself can include the data from first level index L(N) in all SST File Abstracts and the data from second level index in blob file abstracts. The index data can be provided in a single LRU cache to replace both first and second levels of the index.

Figure 10:
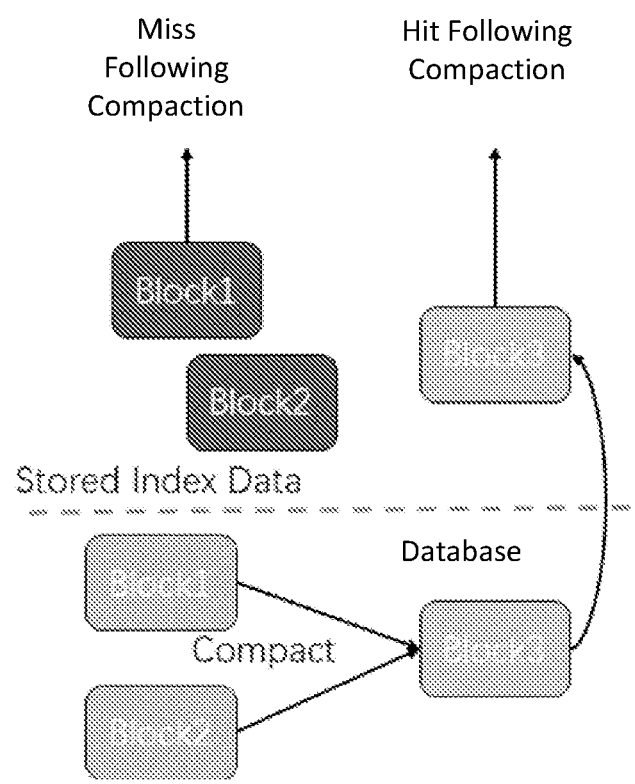
FIG. 10 shows a write-to-read-cache transformation according to an embodiment.

FIG. 10 shows a write-to-read-cache transformation according to an embodiment. Write-to-read cache transformation can be performed by a suitable module of a database system such as write-to-read cache manager 114 described above and shown in FIG. 1. As shown in FIG. 10, when compaction of Blocks 1 and 2 result in formation of Block 3 in the database, the indexes for Blocks 1 and 2 would be invalidated, resulting in a cache miss following compaction. The write-to-read cache transformation generates index data for Block 3 and writes the index information to the index cache following the generation of block 3 by compaction. The proactive writing of index data for Block 3 can be triggered by any suitable condition, to prevent pollution resulting from excessive caching of index information.

Figure 11:
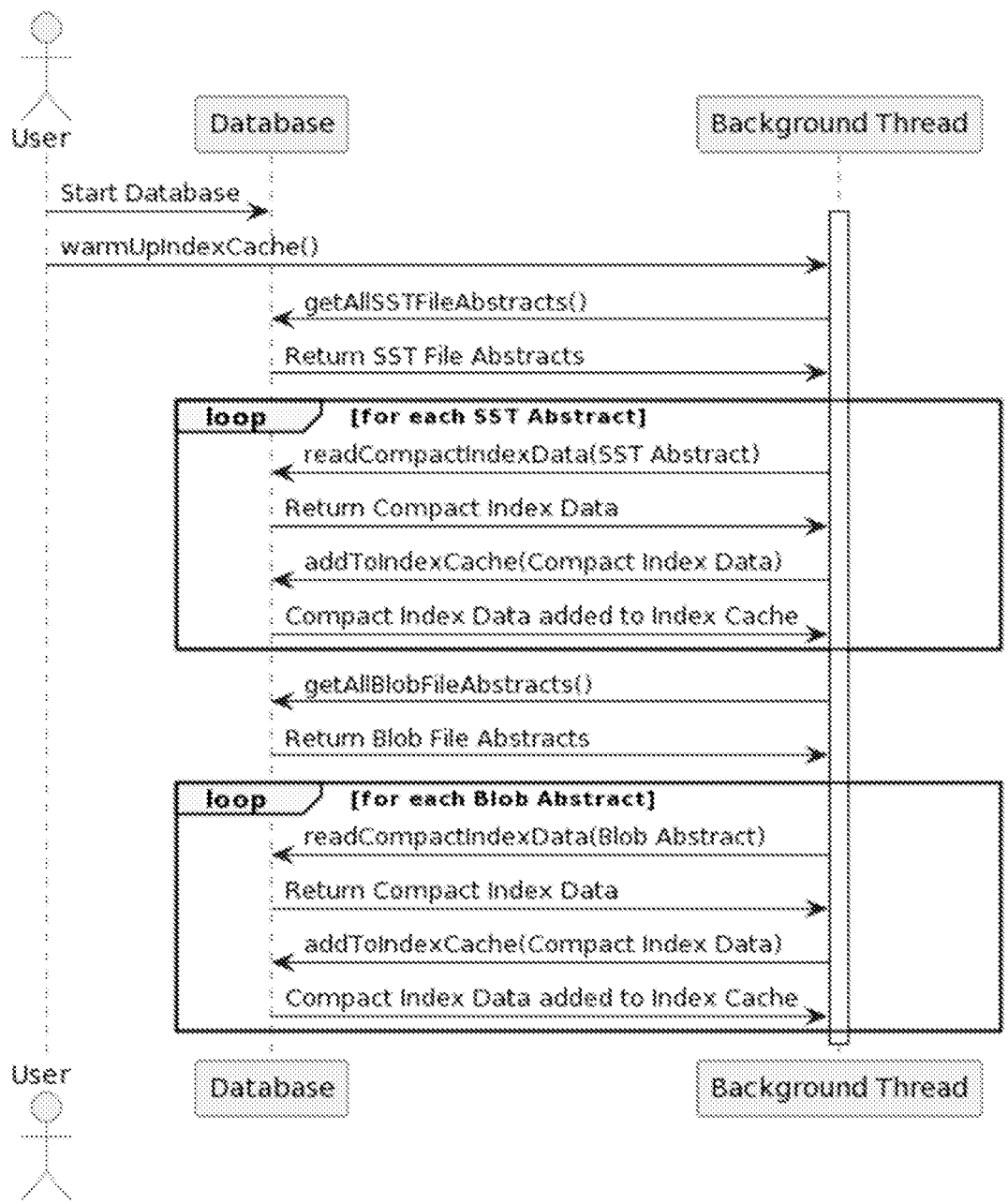
FIG. 11 shows warmup of an index cache according to an embodiment.

FIG. 11 shows warmup of an index cache according to an embodiment. Warmup of an index cache can be performed by a cache warmer module, such as the cache warmer 116 as described above and shown in FIG. 1. During database startup, the Index Cache is empty. By warming the index cache, for example, according to FIG. 11, cache misses and latency fluctuations during point queries following startup can be reduced or avoided. On database startup a background thread that traverses all files on the disk containing the first-level index data and blob file abstracts containing the second-level index data within the database. From the first-level index data such as SST file abstracts and the blob file abstracts, compact index data can be obtained. The compact index data obtained from the disk can then be placed into the index cache to form the compact index cache for supporting future point queries. The addition of the compact index data to the compact index cache can reduce potential cache misses and improve overall query performance.

Figure 12:
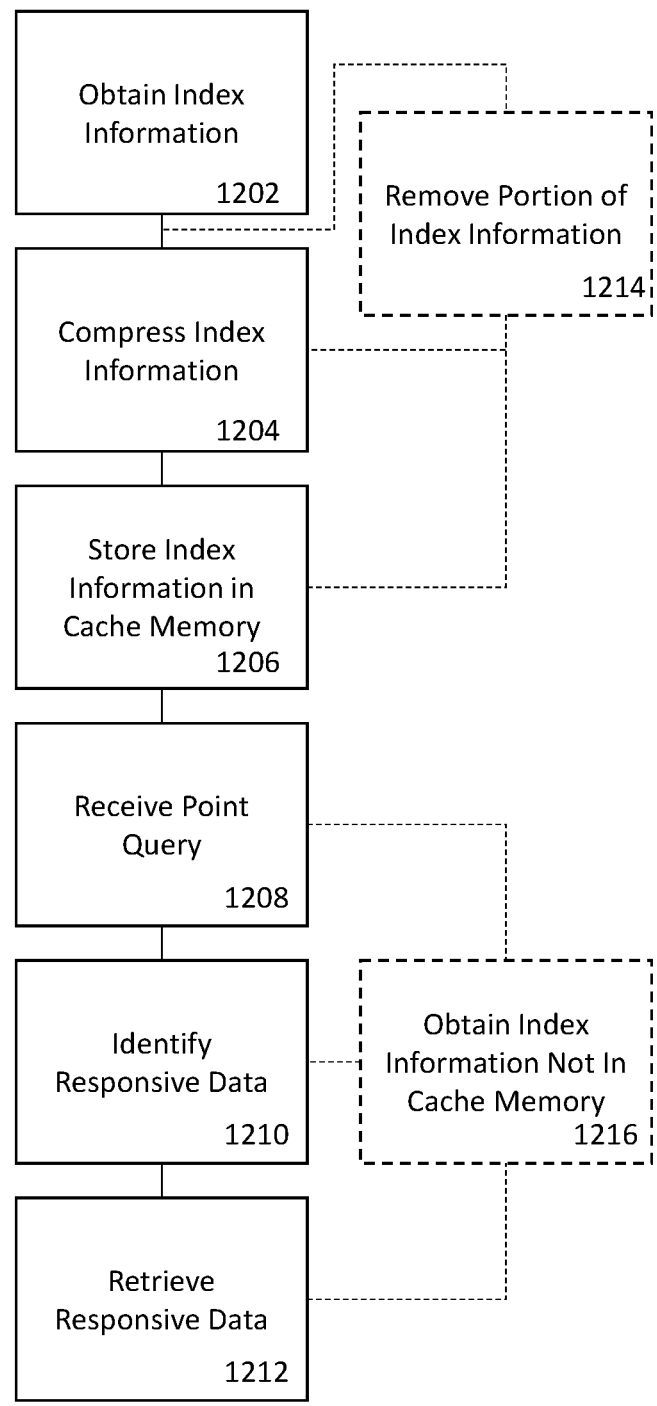
FIG. 12 shows a flowchart of a method for a point query according to an embodiment.

FIG. 12 shows a flowchart of a method for a point query according to an embodiment. Method 1200 includes obtaining index information from the database at 1202, compressing the index information using a processor at 1204, and storing the index information in a cache memory at 1206. The method further includes receiving a point query at 1208, identifying data responsive to the point query at 1210, and retrieving the responsive data from the database at 1212. Method 1200 optionally further includes removing some of the index information at 1214. Optionally, method 1200 further includes accessing the database to obtain index information not present in the cache memory at 1216.

Index information is obtained from the database at 1202. The index information can be obtained by a processor at 1202. The index information can be, for example, key values for respective data components. The index information can be separated from the data components when the index information is obtained from the database at 1202. The index information can be used to provide an index of the data components of the database. The database storing the index information and data components from which the index information is obtained can be on any suitable storage medium, such as one or more PMEM, SSDs, HDDs, or the like.

The index information can be compressed at 1204. The compression can be performed by a processor that has obtained the index information at 1202. The compression of the index information can reduce a size of the index, for example to support storage of some or all of the index in limited cache memory. The compression of the index information can be performed by applying any suitable compression algorithm, with non-limiting examples including Zstandard, LZ4, Snappy, Bzip2, LZMA, Gzip, Blosc, and Crit-Bit-Trie compression algorithms. In an embodiment, the compression of the index information at 1204 can be performed by application of the Crit-Bit-Trie compression algorithm. The compression at 1204 can be performed, for example, when the key values are stored according to Option 2 as discussed above with respect to FIGS. 2 and 3.

The index information can be stored in a cache memory at 1206. The cache memory can be any suitable cache memory device or plurality of devices, with non-limiting examples including DRAM, PMEM, SSDs, or the like. The index information can be stored in the cache memory at 1206 such that the index information can be referenced when a point query is received, without accessing a storage memory of the database.

A point query can be received at 1208. The point query can be a request for a specific piece of information from the database. The point query can be received from any suitable source, for example, user input, other system components, APIs, and the like. The point query can be received at a processor. In an embodiment, the processor can be the same processor that obtained the index information at 1202 and/or compressed the index information at 1204.

Data responsive to the point query is identified at 1210. The data responsive to the point query can be identified by reference to the index information that is stored in the cache memory. The data responsive to the point query can be identified by way of the association of the key value with a particular file. The responsive data can then be retrieved from the database at 1212. The responsive data can be retrieved by way of an I/O operation to the storage disk containing the responsive data. In an embodiment, the I/O operation to the storage disk to retrieve the responsive data can be the only I/O operation required to conduct and complete the point query received at 1208.

Optionally, some of the index information can be removed at 1214. The index information can be removed to reduce a size of the index information, for example to allow the index information to be stored in cache memory even when the cache memory has limited space. The index information removed can be from the index information held in cache memory, with the index information in the storage media of the database being maintained. The index information can be removed based on a strategy to support the relevance of the index information that is maintained in cache memory. One non-limiting example of a strategy for the removal of index information at 1214 can be a least recently used (LRU) strategy.

The database can be accessed to obtain index information not present in the cache memory at 1216. The accessing of the database at 1216 can be access of one or more memories of the storage media of the database. The accessing of the database at 1216 can be performed when a cache miss occurs and the data responsive to the point query cannot be determined based on the index information stored in the cache memory. For example, the cache miss can occur when the removal of index information at 1214 has affected index information relevant to the point query received at 1208. The accessing of the database can provide the index information relevant to the point query received at 1208, such that data responsive to the point query can be successfully identified and subsequently obtained from the storage media of the database.

Figure 13:
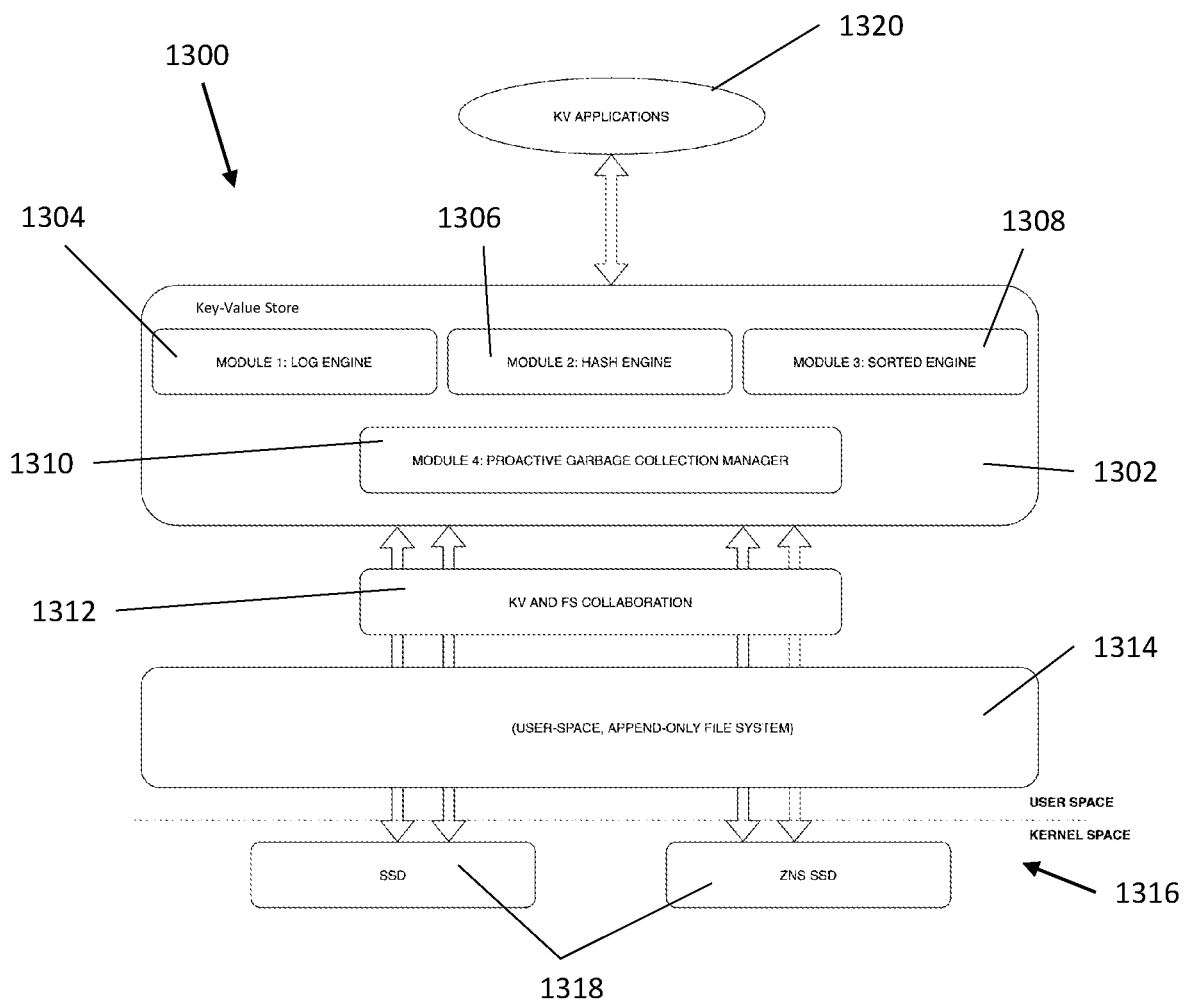
FIG. 13 shows a key-value system integrated with a file system according to an embodiment.

FIG. 13 shows a key-value system integrated with a file system according to an embodiment. Key-value store and file system 1300 includes key-value system 1302. Key-value system 1302 includes a log engine 1304, a hash engine 1306, a sorting engine 1308, and a garbage collection manager 1310. Key-value store and file system 1300 further includes a collaboration layer 1312 and file system 1314. Key-value store and file system 1300 can interact with a kernel space 1316, kernel space 1316 including one or more disks 1318. The key-value store and file system 1300 can interact with applications 1320.

Key-value and file system 1300 can be used for storage in cloud applications, for example to provide data persistence required by cloud services. Key-value system 1302 is configured to provide a key-value store, for example as part of a storage backend for cloud services. Non-limiting examples of cloud services using key-value systems 1302 include shopping, social media, metadata management, and the like. File system 1314 can be a dedicated user-level append-only file system configured to provide storage specialized to facilitate operation of key-value system 1302.

Log engine 1304 is configured to allow concurrent writing of multiple log files, thereby reducing the number of compaction and garbage collection operations. The logs written by log engine 1304 can be configured such that strong sorting is not required for handling of said logs. Log engine 1304 is configured to improve throughput performance issue in log writes and increase recovery speed by reducing the sync write overhead of logs from multiple input/output (I/O)

operations to a single I/O operation, aggregating writes using a lock-free queue to control latency and improve throughput, and/or providing asynchronous interfaces to enhance the thread model. Where key-value system 1302 and file system 1314 are integrated and collaborate, the log engine 1304 can be used to store a write-ahead log (WAL) having a predefined structure having a defined actual file size. The defined file size for the WAL can in turn result in requiring fewer I/O operations, thereby enhancing performance while mitigating potential tradeoffs regarding data consistency.

Hash engine 1306 is configured to handle point queries within the key-value system 1302. In particular, hash engine 1306 is configured to reduce tail latency in point queries. The hash engine 1306 includes separation of data and index components, and maintenance of the index in a cache memory, for example by compression of the index and/or caching of partial data. The partial data can be selected using, for example, a least recently used strategy. The operation of hash engine 1306 is further detailed herein.

Sorting engine 1308 is configured to carry out range scan operations while reducing the write-amplification factor and/or read/write latency associated with such operations. Sorting engine 1308 is configured to can use a partitioned log-structured merge (LSM) tree. The classification of I/O flows and scheduling of tasks can further be carried out by sorting engine 1308.

Garbage collection manger 1310 is configured to carry out garbage collection and/or compaction operations in key-value and file system 1300. The garbage collection manager 1310 can be configured to reduce unnecessary data movement during garbage collection and/or compaction operations in key-value and file system 1300. The garbage collection manager 1310 can conduct garbage collection and/or compaction operations based on awareness regarding application-side data deletion such as expiration of pages. Garbage collection and compaction carried out by garbage collection manager 1310 can be configured to arrange the data to support other modules such as sorting engine 1308. The garbage collection manager 1310 can coordinate preservation of data during the garbage collection and/or compaction operations. The operation of a garbage collection manager 1310 is further detailed in FIGS. 131-13 and described below.

Collaboration layer 1312 is configured to facilitate collaboration between key-value system 1302 and file system 1314. Collaboration layer 1312 can further facilitate efficient compaction and/or garbage collection operations in key-value system 1302 based on the collaboration between the key-value system 1302 and file system 1314. The collaboration can reduce write amplification issues arising from compaction and/or garbage collection operations. In an embodiment, the collaboration layer 1312 can expose zone usage information from key-value system 1302 to the file system 1314.

File system 1314 can be configured to split data from logs and use log-structured append-only writing as the write model, where only append operations can be performed. In an embodiment, the file system can further provide pre-allocated data space where sync writes only occur for the persistence of data, and in an embodiment, do not need to make metadata persistent. In an embodiment, the data persistence for different files and global log persistence can be executed separately. These aspects of the file system can allow the file system to avoid some metadata persistence operations, such as those caused by single data write persistence operations.

The file system 1314 can be configured to support general files and instant files. Both general and instant files can be written sequentially, and both can be read either sequentially or randomly. General files can be optimized for consistently low latency in either sequential or random reads. General files can be used for writing data in batches that do not require flushing the data to disk after each write, such as SST files. The storage space is allocated in large units, with a non-limiting example of unit size being 1 MB each. The large allocation unit can reduce metadata size for general files, such that metadata of all general files can be kept in memory during normal file system operation. By keeping the metadata in memory, no read operation to general files would require further I/O for metadata access, regardless of the read offset. This can reduce read tail latency for general files. Instant files can be optimized for fast, incremental synchronous writes while having good sequential and random read performance near the tail. Instant files can be used for writing data that requires frequent flushing to disk for instant durability, such as write-ahead log files of the key-value system. The data and metadata of each individual write can be bundled together for instant files. The bundled data and metadata can be written to a journal file shared by all instant files. The bundling of data and writing to the journal file can improve the speed of incremental write and sync operations. This approach is structured to support sequential reads, but can have tradeoffs regarding random reads. Since instant files are expected to be mostly read sequentially, with random reads mostly concentrated near the tail most recently written data of each instant file that is actively being written can be cached to improve read performance.

The file system 1314 can include a user-space I/O scheduler to assign I/O priority to different I/O types. The I/O scheduler will mark foreground I/O as high priority while background I/O will be marked as low priority. In addition, the key-value system 1302 can include a scheduler to schedule its background tasks in order to ensure that each I/O issued by the upper layer applications has a consistent I/O amplification. Through this co-design of I/O scheduling in both key-value system 1302 and file system 1314, the tail latency can be kept stable and low as both the I/O amplification and I/O latency are consistent. Moreover, reading general files from the file system requires no I/O for metadata, and use of large spaces for the general files can ensure that most read operations require a single I/O.

Kernel space 1316 can contain disks 1318. Disks 1318 can include one or more storage media, such as solid state drives (SSDs). In an embodiment, at least some of disks 1318 are zoned storage (ZNS) SSDs.

Applications 1320 are any suitable applications utilizing the key-value and file system 1300, for example, online shopping, social media, metadata management applications, or the like. The applications 1320 can interface with key-vale and file system 1300 through any suitable application programming interface (API). In an embodiment, the API can be specific for the particular type of file, for example having the nature of the files as general files or instant filed be determined by the API through which the file has been received.

In an embodiment, the method further includes obtaining initial index data when the database is started up, and storing the initial index data in the cache memory.

Aspects:

It is understood that any of aspects 1-10 can be combined with any of aspects 11-20 or 21-22. It is understood that any of aspects 11-20 can be combined with any of aspects 21-22.

Aspect 1. A database system, comprising:
one or more memories storing a database;
a cache memory; and
one or more processors, wherein the one or more processors together are configured to:
    obtain index information from the database, wherein the index information is separate from a data component of the database;
    generate a compact index based on the index information, wherein the compact index is smaller in size than the index information, the compact index generated by at least one of compression of the index information and omission of a portion of the index information from the compact index;
    direct the storage of the compact index in the cache memory;
    receive a point query;
    identify data responsive to the point query by referencing the compact index stored in the cache memory; and
    retrieve the data responsive to the point query from the database.

Aspect 2. The database system according to aspect 1, wherein the index information includes a first-level index mapping keys to blob file numbers and a second-level index mapping keys to block offsets within said blob file.

Aspect 3. The database system according to any of aspects 1-2, wherein the one or more processors are configured to perform the compression of the index information using a compression algorithm selected from the group consisting of Zstandard, LZ4, Snappy, Bzip2, LZMA, Gzip, Blosc, and Crit-Bit-Trie compression algorithms.

Aspect 4. The database system according to aspect 3, wherein the compression algorithm is Crit-Bit-Trie.

Aspect 5. The database system according to any of aspects 1-4, wherein the one or more processors are configured to select the portion omitted from the index information based on a least recently used strategy.

Aspect 6. The database system according to any of aspects 1-5, wherein the portion of the index information omitted from the compact index is stored in the one or more memories, and the one or more processors are configured to obtain the omitted index information from the one or more memories when the index information stored in the cache memory is not responsive to the point query.

Aspect 7. The database system according to any of aspects 1-6, wherein the compact index stored in the cache memory includes all index metadata for the index information.

Aspect 8. The database system according to any of aspects 1-7, wherein the one or more processors are configured to perform cache warmup when the database is started up, the cache warmup including obtaining initial index data and storing the initial index data in the cache memory.

Aspect 9. The database system according to any of aspects 1-8, wherein each key-value entry of the index information stored in the cache memory has a size of 6 B or less.

Aspect 10. The database system according to any of aspects 1-9, wherein the one or more processors are configured to identify the data responsive to the point query and to retrieve the data responsive to the point query from the one or more memories storing the database using one single input/output operation.

Aspect 11. A method for point querying of a database, comprising:
    obtaining index information from the database, the index information being separate from a data component of the database;
    generating, based on the index information, a compact index using a processor, wherein generating the compact index includes at least one of compressing the index information and omitting a portion of the index information from the compact index;
    storing the index information in a cache memory;
    receiving a point query;
    identifying data responsive to the point query by referencing the index information stored in the cache memory; and
    retrieving the responsive data from the database.

Aspect 12. The method according to aspect 11, wherein the index information includes a first-level index mapping keys to blob file numbers and a second-level index mapping keys to block offsets within said blob file.

Aspect 13. The method according to any of aspects 11-12, wherein generating the compact index includes compressing the index information using a compression algorithm selected from the group consisting of Zstandard, LZ4, Snappy, Bzip2, LZMA, Gzip, Blosc, and Crit-Bit-Trie compression algorithms.

Aspect 14. The method according to aspect 13, wherein the compression algorithm is Crit-B it-Trie.

Aspect 15. The method according to any of aspects 11-14, wherein generating the compact index includes omitting the portion of the index information from the compact index, wherein said portion of the index information is determined based on a least recently used strategy.

Aspect 16. The method according to aspect 15, wherein when the index information stored in the cache memory is not responsive to the point query, the method further includes accessing the database to obtain the omitted portion of the index information.

Aspect 17. The method according to any of aspects 11-16, further comprising performing cache warmup when the database is started up, wherein cache warmup includes obtaining initial index data and storing the initial index data in the cache memory.

Aspect 18. The method according to any of aspects 11-17, wherein the identifying of data responsive to the point query and the retrieving of the responsive data from the database is performed using one single input/output operation.

Aspect 19. The method according to any of aspects 11-18, wherein each key-value entry of the index information stored in the cache memory has a size of 6 B or less.

Aspect 20. The method according to any of aspects 11-19, wherein the compact index stored in the cache memory includes all index metadata for the index information.

Aspect 21. A hash engine system for a database, comprising one or more processors configured to:
    receive index information, wherein the index information is separate from a data component of the database;
    generate a compact index based on the index information, wherein generating the compact index includes at least one of compression of the index information and omission of a portion of the index information from the compact index; and
    direct storage of the compact index in a cache memory.

Aspect 22. The hash engine system according to aspect 21, wherein the one or more processors are further configured to:
    receive a point query;
    reference the compact index to determine data responsive to the point query; and
    based on the compact index, obtain the data responsive to the point query from a database.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A database system, comprising:
one or more memories storing a database;
a cache memory; and
one or more processors, wherein the one or more processors together are configured to:
obtain index information from the database, wherein the index information is separate from a data component of the database;
generate a compact index based on the index information, wherein the compact index is smaller in size than the index information, the compact index generated by at least one of compression of the index information and omission of a portion of the index information from the compact index;
direct the storage of the compact index in the cache memory;
receive a point query;
identify data responsive to the point query by referencing the compact index stored in the cache memory; and
retrieve the data responsive to the point query from the database.

2. The database system of claim 1, wherein the index information includes a first-level index mapping keys to blob file numbers and a second-level index mapping keys to block offsets within a blob file.

3. The database system of claim 1, wherein the one or more processors are configured to perform a compression of the index information using a compression algorithm selected from the group consisting of Zstandard, LZ4, Snappy, Bzip2, LZMA, Gzip, Blosc, and Crit-Bit-Trie compression algorithms.

4. The database system of claim 3, wherein the compression algorithm is Crit-Bit-Trie.

5. The database system of claim 1, wherein the one or more processors are configured to select the portion omitted from the index information based on a least recently used strategy.

6. The database system of claim 1, wherein the portion of the index information omitted from the compact index is stored in the one or more memories, and the one or more processors are configured to obtain the omitted index information from the one or more memories when the index information stored in the cache memory is not responsive to the point query.

7. The database system of claim 1, wherein the compact index stored in the cache memory includes all index metadata for the index information.

8. The database system of claim 1, wherein the one or more processors are configured to perform cache warmup when the database is started up, the cache warmup including obtaining initial index data and storing the initial index data in the cache memory.

9. The database system of claim 1, wherein the one or more processors are configured to identify the data responsive to the point query and to retrieve the data responsive to the point query from the one or more memories storing the database using one single input/output operation.

10. A method for point querying of a database, comprising:
obtaining index information from the database, the index information being separate from a data component of the database;
generating, based on the index information, a compact index using a processor, wherein generating the compact index includes at least one of compressing the index information and omitting a portion of the index information from the compact index;
storing the index information in a cache memory;
receiving a point query;
identifying data responsive to the point query by referencing the index information stored in the cache memory; and
retrieving the responsive data from the database.

11. The method of claim 10, wherein the index information includes a first-level index mapping keys to blob file numbers and a second-level index mapping keys to block offsets within a blob file.

12. The method of claim 10, wherein generating the compact index includes compressing the index information using a compression algorithm selected from the group consisting of Zstandard, LZ4, Snappy, Bzip2, LZMA, Gzip, Blosc, and Crit-Bit-Trie compression algorithms.

13. The method of claim 12, wherein the compression algorithm is Crit-Bit-Trie.

14. The method of claim 10, wherein generating the compact index includes omitting the portion of the index information from the compact index, wherein said portion of the index information is determined based on a least recently used strategy.

15. The method of claim 14, wherein when the index information stored in the cache memory is not responsive to the point query, the method further includes accessing the database to obtain the omitted portion of the index information.

16. The method of claim 10, further comprising performing cache warmup when the database is started up, wherein the cache warmup includes obtaining initial index data and storing the initial index data in the cache memory.

17. The method of claim 10, wherein the identifying of data responsive to the point query and the retrieving of the responsive data from the database is performed using one single input/output operation.

18. The method of claim 10, wherein the compact index stored in the cache memory includes all index metadata for the index information.

19. A hash engine system for a database, comprising one or more processors configured to:
receive index information, wherein the index information is separate from a data component of the database;
generate a compact index based on the index information, wherein generating the compact index includes at least one of compression of the index information and omission of a portion of the index information from the compact index; and
direct storage of the compact index in a cache memory.

20. The hash engine system of claim 19, wherein the one or more processors are further configured to:
receive a point query;
reference the compact index to determine data responsive to the point query; and
based on the compact index, obtain the data responsive to the point query from the database.

* * * * *